United States Patent [19]

Fischer

[11] 4,240,800
[45] Dec. 23, 1980

[54] PROCESS FOR TREATMENT OF BAGASSE FOR THE PRODUCTION OF OIL BINDERS

[76] Inventor: Karl O. P. Fischer, 302 - 124 Cook St., Chilliwack, British Columbia, Canada

[21] Appl. No.: 954,001

[22] Filed: Oct. 23, 1978

[51] Int. Cl.$^3$ .............................................. C10L 1/04
[52] U.S. Cl. ..................................................... 44/51
[58] Field of Search ................ 44/51; 210/36; 162/96; 110/342

[56] References Cited

U.S. PATENT DOCUMENTS

| | | |
|---|---|---|
| 3,081,218 | 3/1963 | Ambrehl et al. ...................... 162/19 |
| 3,328,170 | 6/1967 | Hansen et al. . |
| 3,536,615 | 10/1970 | Bunn ..................................... 210/36 |
| 3,673,095 | 6/1972 | Archer . |
| 3,694,308 | 9/1972 | Botz ....................................... 162/55 |
| 3,791,990 | 2/1974 | Fischer . |
| 4,047,489 | 9/1977 | Voorheis et al. .................... 110/342 |

*Primary Examiner*—Jacqueline V. Howard
*Attorney, Agent, or Firm*—Carver & Company

[57] ABSTRACT

A novel oil absorbent comprising substantially sugar-free, hydrophobic, oleophilic bagasse prepared by saturating with water, removing the sugar, and then drying, which will absorb oil in an amount up to about 27 times its weight. The oil saturated absorbent is useful as a fuel.

3 Claims, 1 Drawing Figure

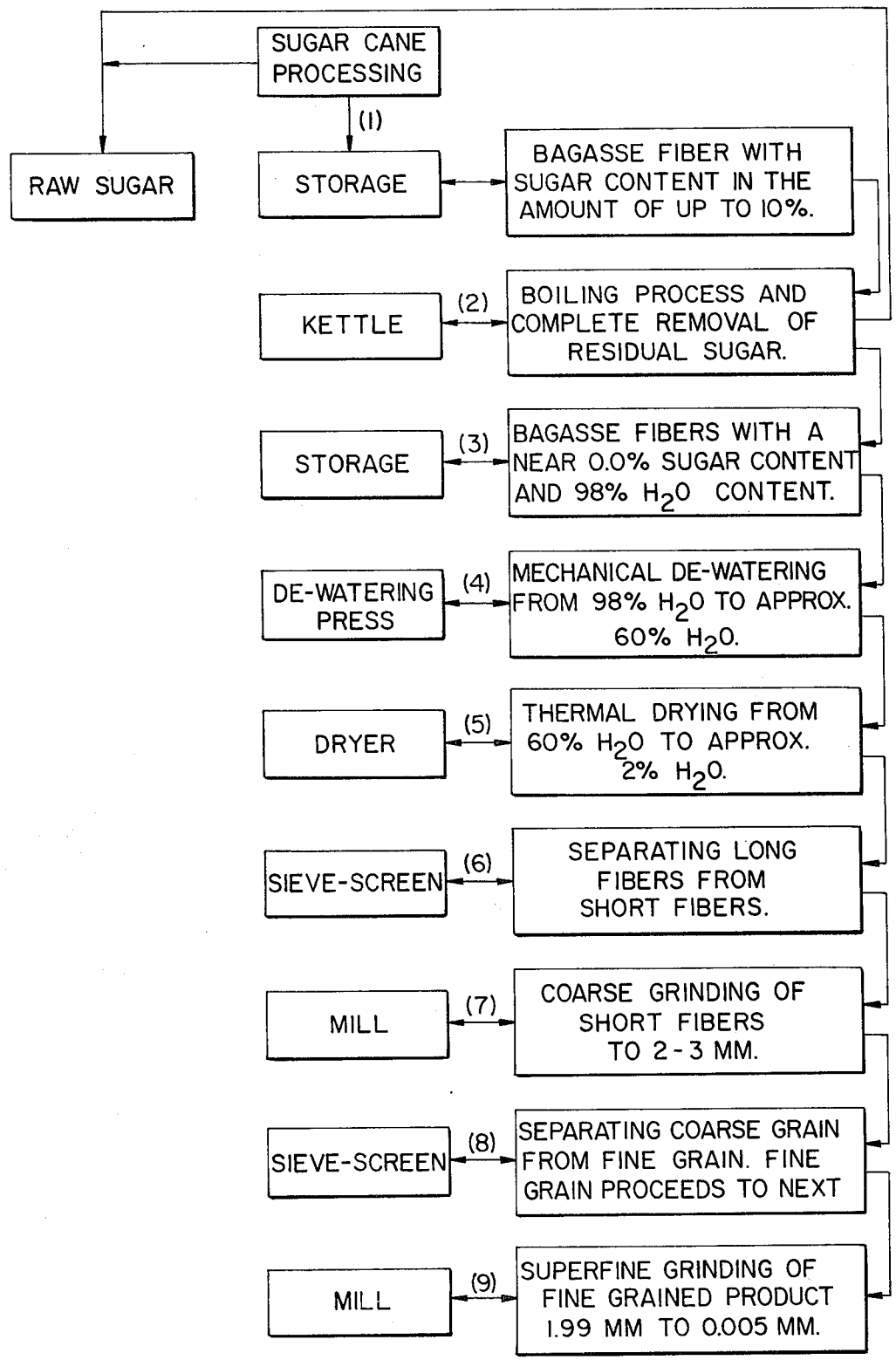

PROCESS FOR TREATMENT OF BAGASSE FOR THE PRODUCTION OF OIL BINDERS

BACKGROUND OF THE INVENTION (1) Field of the Invention

This invention relates to a process for treating fibrous cellulosic materials, particularly bagasse, for use as an oil absorbative and to a novel fuel composition comprising oil saturated absorbent material.

(2) Description of the Prior Art

Bagasse is the remains obtained in the sugar production from sugar cane, i.e. the squeezed stems of the cane containing still up to 10% sugar.

Bagasse is used—as it is well known—as fuel as well as for the production of paper and furfural. Generally known is also its oil absorption capacity. The ratio of the absorption power is 1:5, that means 1 kg bagasse binds 5 kg oil. Particular characteristics of a specific treatment of bagasse in a certain process for preparing an oil binder are not known. There are no indications about the moisture content, the form, formation, and the outline of the bagasse.

It has long been desired to find an appropriate use for bagasse, the natural by-product of the sugar industry. Typical of such attempts are U.S. Pat. No. 4,047,489 which teaches a process for preparing bagasse for use as a fuel for steam power generation and U.S. Pat. Nos. 3,694,308 and 3,081,218 which teach the use of bagasse for incorporation into pulp and pulp products.

While the oil absorbing nature of cellulosic materials, such as taught in U.S. Pat. No. 3,536,615, is known, bagasse has never before been prepared in a manner suitable for practical and economical use as an oil absorbent due to its limited capacity for absorbing oil and its hydrophilic tendencies.

Other materials are known for their primary use as oil absorbents. Typical of these products are the mixture of comminuted sphagnum moss, calcined gypsum and perlite taught in U.S. Pat. No. 3,673,095, mineral perlite as taught in U.S. Pat. No. 3,328,170 and peat as taught in U.S. Pat. No. 3,791,990.

The use of other known materials for use in absorbing oil spills in no way anticipates the use of bagasse because of the varying nature of these other materials. For example, unlike minerals or carbonaceous peat which is a young form of coal, bagasse is a renewable resource in the sense that it grows to maturity within one to three years. Unlike cellulosic plant material with no carbonization, e.g. bagasse, peat and mineral perlite must be obtained through the mining process. U.S. Pat. No. 3,791,990, teaches that raw peat has a natural water content of about 90%, can be mechanically dried to about 75% moisture content and then thermically dried in air down to about 8–10% moisture. Drying peat any further is limited by its tendency to self-ignite. Moreover, although peat is partially fibrous, it contains no more than about 20% fibre.

BRIEF SUMMARY OF THE INVENTION

This invention is directed to a treatment of bagasse solids which consist primarily of fibers. According to the present invention, bagasse which is first saturated with water, then put through an intensive boiling process or other lixiviation process to extract any sugar, and finally mechanically and thermically dried to a moisture content of 2–3%, is hydrophobic, virtually free of sugar and capable of absorbing up to 27 times its weight in oil.

The invention teaches process techniques and the production of bagasse oil binders having different applications, whereby the said specific teaching and techniques are based on very carefully and with extreme precision conducted practical experiment and calculations.

Accordingly, the hitherto inefficently treated and inefficently utilized product is converted into an oil binder which is useful for several valuable applications whereby the sugar industry gains not only a new product but also an appreciable increase in productiveness.

More particularly, according to the present invention an oil absorbent is provided from a renewable resource which has heretofore been an agricultural waste product. Even the known utility of bagasse as a fuel is significantly enhanced in that the bagasse of the present invention has less moisture and thus more available heat value per unit of undried weight than bagasse that is presently burned which typically has a moisture content of about 50% by weight. Moreover, after utilization for absorbing oil the bagasse of the present invention may still be burned and will then have significantly more heat value than the original untreated bagasse.

Further, the treatment process of the present invention is totally compatible with the typical processing of the sugar industry in that it will conveniently use normal waste bagasse as it comes out of the sugar extracting process plant (2–10% sugar content) for a starting material and will further extract the remaining sugar during the lixiviation step prior to drying.

BRIEF DESCRIPTION OF THE DRAWING

The single FIGURE of the drawing is a schematic diagram for carrying out the process of the invention.

DETAILED DESCRIPTION

The process techniques and the corresponding means for treatment of bagasse are characterized as follows:

The sugar still contained in the relatively long-fibered bagasse is completely removed by lixiviation, such as by an intensive boiling process. During boiling the bagasse is saturated with water up to 98% (Normal bagasse is about 50% $H_2O$.). In this condition the bagasse is mechanically dewatered, e.g. filled in a filter cloth of spun glass and this product is brought into a mechanic pressure means wherein it is continuously rotated, twisted together and thereby squeezed and wrung out, according to the principle of compressing and wringing.

According to this principle the bagasse containing 98% water is dewatered to about 60% water content, whereby from 1 kg=980 gr water+20 gr dry substance=98% $H_2O$+2% dry substance;

950 gr water are squeezed, corresponding to 97% dewatering. The remainder is:

50 gr=30 gr water+20 gr dry substance=60% $H_2O$+40% dry substance.

In a thermic drying process the water content of the fibrous material is further decreased to 2–3%. In this state the material has already the character of an oil binder as sought by the invention. It is absolutely oil absorptive but water repellent. The following treatment of the material is separated into three (3) steps in order to obtain three (3) products which are different in the form, formation, in the outline and in the application.

FIRST STEP

Due to the handling and other physical manipulation during the boiling process, the mechanical pressure dewatering and the heat drying the initial long fibers of the material are reduced to fibers of different length. The material now composed to medium and short fibers is treated in a mechanic screen or sieve device to separate it into long fibers and substantially shorter fractions. The long fibrous material obtained this way is an oil binder useful for specific filtering procedures. For example, fibers maybe contained in a filter box to extract oil from running water. The longer fibers thus will be contained where shorter fibers or particles would be washed away.

Typically, the values of weight and volume as well as of the absorption capacity and binding ability are as follows:

1 kg = 1000 gr = vol. 35–40 liter diff. mixed bulk density

The absorption capacity per liter = 25–28 gr oil binder = 0.075 liter oil = 600 gr (where specific gravity of oil is 0.8)

1 kg = 35–40 liter oil binder which will bind 16.8–19.2 kg = 21–24 liter oil.

SECOND STEP

The short-fibered fractions resulting from screening or sifting procedure are ground in a beater mill or the like. The purpose of this grinding is the production of an oil binder having a grain size of 2–3 mm. The obtained product is also sifted or screened, whereby the fraction of less than 2 mm is separated from the coarse grain. The obtained product is also sifted or screened, whereby the fraction of less than 2 mm is separated from the coarse grain. The values of weight, volume, absorption and binding capacity of the oil binder having a 2–3 mm particle size are as follows:

1 kg = 1000 gr = vol 33 liter at normal bulk density

The absorption capacity per liter = 30 gr oil binder = 800 gr/liter oil 1 kg = 33 liter oil binder which will bind 26.4 kg 33 liter oil

THIRD STEP

The material having a grain of less than 2 mm is ground in a colloid mill to obtain a finest grain of about 5 micron. The resulting product (dust, powder, flour or the like) is an oil binder which can be used in an exhaust blower or blast nozzle, for instance in oil bunkers where it can be blown in dosed amounts onto the oil coated bunker walls to impinge and absorb the oil layers. After about 10 minutes the absorption i.e. the binding procedure is terminated, and the oil binder can easily be removed from the walls by using any conventional suction device. The values of weight, volume, absorption and binding capacity are as follows:

1 kg = 1000 gr = vol about 20 liter at normal bulk density

The absorption capacity per liter oil binder = 50 gr = 800 gr oil = 1 liter 1 kg = 20 liter oil binder bind 16 kg = 20 liter oil The described oil binders of the invention have no essential water absorptive properties and they are water repellent and floatable.

PREFERRED EMBODIMENT

A preferred embodiment can be best described by reference to FIG. 1. Residual bagasse fiber from sugar cane processing is optionally stored or collected (1). Such bagasse, with a sugar content of up to 10%, more typically 2–5%, is then placed in a kettle (2). Water is added to achieve about 98% saturation and the water saturated bagasse is then further desugared by lixiviation.

Typically, the lixiviation of the bagasse involves boiling at a temperature and for a time sufficient to extract substantially all the sugar from the fibers or pith of the sugar stalks. Lower temperatures will typically require longer periods of time. The boiling may take place at a temperature of at least about 212° F. or under pressure and at a higher temperature, for a time period of from at least about 10–30 minutes, preferably 15 to 20 minutes, to several hours. In a specific embodiment the bagasse is placed in a pressure pot for about 15 to 20 minutes, at about 15 psig and 250° F.

After termination of the lixiviation or boiling process the slurry of bagasse may typically be drained and washed with water to remove and/or recover the remaining sugar in solution. The resulting bagasse fibers with a sugar content of 0.0–0.2%, preferably near 0.0% and about 98% water content are then optionally stored (3) or proceed directly to mechanical dewatering equipment (4), more particularly a dewatering device, e.g. a dewatering press, where the moisture content is reduced from about 98 to about 60%. The bagasse is then thermally dried (5) in a dryer to further reduce the moisture content from 60% to about 2%.

In this state the fibrous bagasse residue exhibits the character of an oil-binder as sought by the present invention, i.e. it is strongly oleophilic (readily absorbs oil) while simultaneously repelling water due to its hydrophobic quality acquired by the processing. While not intending to be in any way limited by the following explanation it is believed that the bagasse fibers undergo increased cross-linking as dewatering continues down to about 2–3% and that this degree of cross-linking and thus the degree of hydrophobicity and oleophilia achieved by the process of the present invention is related to the degree of cross-linking and thus to the ability to reduce without fear of combustion, the moisture content of the bagasse to about 2%. It should be noted that the process of the present invention is thus applicable to fibrous cellulosic materials other than bagasse. So long as they have not beeen subjected to any significant carbonization and are thus capable of being dried to the degree required by the present invention. Typical of such fibrous cellulosic materials are dried or coarse grasses, i.e. straw, hay or reeds, cereal grass, e.g. corn, and pineapple or coconut fibers.

As a result of handling and physical manipulation throughout the process, including the pressure of the mechanical dewatering procedure, the originally longer fibers of the bagasse are reduced to fibers of varying length. Such fibers are thus passed into a mechanic screen or sieve (6) and separated from the very short fibers and dust. The longer fibers obtained in this fashion are oil binders and particularly useful for special filtering purposes and to serve in the manufacture of special envelopes which can contain much finer fibrous materials. Such filled containers or envelopes, woven with the longer bagasse fibers, i.e. end products, are useful for oil-spill clean-up. In a preferred embodiment, the fibers have a water content of about 2% and more typically 2–3% and are from 3–7 mm in length, more particularly 3–5 mm. The bulking value of such fibers is typically 25 to 28 grams/liter and their oil take-up capacity is from about 1680 to 1920 weight percent. Water take-up will vary from 50 to 100 weight percent.

The short fibers and dusts resulting from the initial screening or sieving operation are then ground (7) in a hammermill or otherwise pulverized to a size of approximately 2–3 millimeter. The ground material is again screened (8) to separate the 2–3 mm long fibers from shorter fractions and dusts. In the preferred embodiment the 2–3 mm bagasse has a water content of about 2–3%, a bulking value of 33 grams/liter and an oil take-up capacity of about 2640 weight percent. Water take-up will vary from 80–120 weight percent.

Fibers of less than 2 mm in lengths and dusts obtained from the hammermill are processed in a colloid mill (9) to a particle size of approximately 5 microns. The resulting material, a powder, is particularly suitable for cleaning oil-coated surfaces such as in oil bunkers and tanks. Typically, it can be administered by blower and, on completion of the oil binding/absorption cycle (approx. 10 to 15 minutes later), the oil soaked powder can simply be removed utilizing conventional vacuum techniques. The bagasse powder will typically have a moisture content of about 2–3%, a bulking value of about 50 grams/liter and an oil take-up capacity of about 1600 weight percent. Water take-up will vary from 100 to 150 weight percent.

It is contemplated within the scope of this invention that anytime, but preferably subsequent to thermal drying the bagasse fibers or powder may be chemically treated so as to be totally hydrophobic.

The following examples are provided by way of illustration and not limitation.

EXAMPLE 1

Test sample No. 1 was prepared from a mixture of bagasse dust and fibers obtained from the Koloa Mill of the McBryde Sugar Company, Kauai, Hawaii. The bagasse mixture was desugared by being placed in a pot and boiled at atmospheric pressure for about 10 to 12 minutes. The bagasse was then drained in a sieve and put back into the pot with water. This boiling process was repeated 10–12 times for a total boiling time of 1½–2 hours until the bagasse was a golden color and the water was clear. After being drained in a sieve for the last time the bagasse was mechanically dried by being placed in a 30 mm thick foam rubber filter cloth (30×40 cm) and exposed to a mechanical pressure means whereby it was continuously rotated, twisted together and thereby squeezed and wrung out. The bagasse with an estimated 60% moisture content was then oven-dried at 105° C. (221° F.) for 8 hours thereby reducing the moisture content to about 2%. The bagasse floated when placed on water. The sample was then separated by screening into fibers longer than about 5 mm and a shorter fiber—dust mixture.

EXAMPLE 2

Test Samples Nos. 2, 3, 4 and 5 refer to a mixture of bagasse powder and fibers obtained from the Paia Mill of the Hawaiian Commercial and Sugar Company, Maui, Hawaii, which is a diffusion-type of sugar factory. Test Sample No. 2 refers to some of the bagasse powder taken from the mixture before any processing and which was left untreated. The bagasse fiber (Test Sample No. 3) obtained from the diffusion process had been through a Walker 5 Roller Mill and as such had only about 47% moisture content.

Test Sample Nos. 4 and 5 refer to bagasse "dust" collected from the bagasse "house" at the Paia Mill.

Test Sample Nos. 3 and 4 were desugared by being placed in a pressure pot for 15 to 20 minutes at 15 psig (250° F.). After the pressure was released the bagasse was drained and then squeezed to eliminate as much water as possible. The bagasse was then oven-dried at 270° C. for 8 hours. The sample was then separated by screening into fibers longer than about 5 mm and a shorter fiber-dust mixture.

Test Sample No. 5, like No. 2 was left untreated.

EXAMPLE 3

Bagasse samples prepared in Examples 1–3 were tested as follows:

(1) A measured amount of water (200 gm) and oil was placed in a beaker. 2 grams of a sample was spread on an oil layer resting on the water, either fresh or salt, i.e. sea water. After about 10 minutes the oil saturated bagasse was removed and the beaker and its contents were weighed. The comparative results obtained with the four samples are tabulated in Table 1.

(2) Unweighed samples were put in beakers containing oil and water. The observed results are described in Table 2.

EXAMPLE 4

Bagasse shipped and stored in an airtight container, secured from Rosedale Machine Shop Ltd., Chilliwack, British Columbia, was tested by the procedure described below. The bagasse had been mechanically dried to a moisture content of about 52% and had a sugar content of about 10%.

A sample (approx. 5 kg) was boiled at atmospheric pressure in an 8 liter pot for 10 minutes and then drained in a sieve. This was repeated 10–12 times using fresh water each time until the water boiling in the pot was clear and the bagasse was much lighter than its original color, almost white. The bagasse was then rolled in a foam rubber sheet and the excess water was wrung out to reach a moisture content of about 60%. The bagasse was then oven-dried at 105° C. (221° F.) for 8 hours. The bagasse was then separated using sieves into fibers longer than 2–3 mm, fibers less than 2–3 mm and particles ground by an electric grinder to about 5 microns.

Samples of the bagasse as prepared above were then tested using Shell 100-X motor oil. In small glass dishes, some dry, some containing water and some containing water with oil on the surface, 10 gram samples of longer fibers, shorter fibers, or particles were spread evenly on the surface.

Oil binding capacity was determined by continuously adding oil in measured amounts to the various dishes and then weighing and measuring the resulting oil saturated samples.

The samples of longer fibers demonstrated an oil binding capacity of from 1680 to 1920 weight percent while absorbing from 50 to 100 weight percent water. The short fiber samples demonstrated an ability to absorb 2640 weight percent oil and absorb from 80–120 weight percent water. The particles demonstrated an ability to absorb 1600 weight percent oil and absorbed from 100 to 150 weight percent water.

The extent of absorbance of the bagasse due to a capillary-type of action was demonstrated as follows:

Bagasse prepared above was loosely put into an open-ended glass tube of 30 mm diameter and 40 cm length. The tube was fixed so that its end rested on a surface of oil (about 3 mm thick) on water. After 24 hours the oil had risen 34 cm in the tube as evidenced by the discoloration of the bagasse.

TABLE 1
BEAKER TESTS
(weight grams) Bagasse/Oil Absorption

| Sample No. | Water | Oil | Bagasse | Beaker, oil Bagasse, water | Beaker, oil remaining & water | Diff. | Oil removed |
|---|---|---|---|---|---|---|---|
| Fresh water: | | | | | | | |
| 1 | 200 | 25 | 2 | 377 | 361 | 18 | 17 |
| 1 | 200 | 25 | 2 | 377 | 354 | 23 | 21 |
| 3 | 200 | 60 | 2 | observation only | very few fines; dampened by rain after preparation | | |
| Salt Water: | | | | | | | |
| 2 | 200 | 60 | 2 | 413 | 379 | 34 | 32 |
| 4 | 200 | 25 | 2 | 375 | 340 | 35 | almost total also some water removed |
| 1 | 200 | 25 | 2 | 379 | 358½ | 21½ | 19½ |

TABLE 2

| | |
|---|---|
| Salt Water | - unweighed test sample No. 1 - very little sinking |
| Salt Water | - unweighed test sample No. 4 - some sinking |
| Salt Water | - unweighed bagasse dust from test sample No. 1 - almost no sinking |
| Salt Water | - unweighed test sample No. 5 - much quicker sinking |

TABLE 2-continued

Test sample 3 was tested for sugar content with negative result by Alpha Napthol test.
Test sample 4 was tested for sugar content with negative result by Alpha Napthol test.

What I claim is:

1. A method for absorbing oil comprising spreading on such oil an absorbent comprising about 97 weight percent oleophilic, hydrophobic substantially sugar-free bagasse and about 3 weight percent water capable of taking-up an amount of oil equalling from about 15 to 20 times its weight.

2. A method for absorbing oil comprising spreading on such oil an absorbent comprising about 97 weight percent oleophilic, hydrophobic, substantially sugar-free bagasse fibers of about 2 to 3 mm. in length and about 3 weight percent water capable of taking-up an amount of oil equal to from about 20 to 27 times its weight.

3. A method of absorbing oil comprising spreading on such oil an absorbent comprising about 95 weight percent oleophilic, hydrophobic bagasse fibers having a grain size of approximately 5 microns capable of taking-up as much as 16 times its weight in oil.

* * * * *